Dec. 1, 1953   R. L. WILSON   2,661,403
CONTROL APPARATUS
Filed Jan. 22, 1949

Inventor:
Rosser L. Wilson
By: Wallace and Cannon
atty's.

Patented Dec. 1, 1953

2,661,403

UNITED STATES PATENT OFFICE 2,661,403

CONTROL APPARATUS

Rosser L. Wilson, Mahwah, N. J., assignor to American Brake Shoe Company, New York, N. Y., a corporation of Delaware Application January 22, 1949, Serial No. 72,170

13 Claims. (Cl. 200—24)

This invention relates to control apparatus for use in governing the relative speeds of moving parts of machinery such as shafts and the like, and more particularly it relates to such control apparatus having a single stator disposed in engagement with sensing members carried by two rotors.

The need for control apparatus of the aforesaid character may arise in any situation where it is desirable that the variantly adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated relationship.

The use of one or more engines as the driving power for an airplane affords one typical situation where control apparatus of the aforesaid character is desirable, for whether the airplane be driven by a single engine, or by two or more similar engines, the maintenance of the desired speed of operation in such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a standard from which the speed of operation of the single engine may be automatically governed by control apparatus of the aforesaid character; while in an airplane having a plurality of engines, such control apparatus may serve to coordinate the speed of all of the engines with the speed of such a variable speed electric motor, or if desired, a particular one of the engines may serve as the variable standard of speed, and such control apparatus may serve to coordinate the speed of the other engines with the one engine which in such an event constitutes the standard or master engine.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patents, to Wilson No. 2,232,753, patented February 25, 1941, and Nos. 2,443,437 and 2,443,438, patented June 15, 1948, several forms of control apparatus are disclosed which meet these fundamental requirements. It is, however, an important object of this invention to enable further improvement of the operating characteristics of such control apparatus to be attained.

Control apparatus of the aforesaid character attains the desired speed correlation through the control of power operated speed adjusting mechanism which, upon detection of undesired speed variance, acts to adjust the speed of the secondary shaft or the like in such a sense as to tend to re-establish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

In the operation of control apparatus of the kind to which this invention relates, the detection of an undesired speed variance by the detecting means of the apparatus causes a control impulse to be transmitted to the speed adjusting means of the shaft which is being controlled thereby.

In the control apparatus disclosed in the aforesaid patents, the detection of the undesired speed differential between a master shaft and one or more secondary shafts is accomplished through commutator switch devices associated with the respective shafts so as to compare the speeds of the master and secondary shafts and transmit energizing impulses in succession along different electrical paths to associated relay switch mechanism, and this relay switch mechanism, in accordance with the order or sequence in which such impulses are received from such electrical paths and in accordance with the time spacing of such impulses, is operable to determine whether the speed differential between the compared shafts exceeds the allowable tolerance and in which sense a corrective adjustment must be applied to the secondary shaft to re-establish the desired speed relationship; and upon such determination one or more control impulses are transmitted in succession to the speed adjusting means to cause corresponding periods of corrective speed adjustment in the required direction or sense. The relay switch mechanism of the aforesaid patent is such that it includes a first or master relay which is of the slow-to-release type, and when a speed differential between the two compared shafts causes this relay to be momentarily energized, the contacts of this master relay remain closed for a predetermined delay period determined by the release time of the relay. Two secondary relays are also included in the aforesaid relay switch mechanism, and depending on the sense of the existing speed variance or differential, a circuit to one of these secondary relays may next be closed through the commutator switches. If such circuit closure takes place during the delay period of the slow-to-release or master relay, the corresponding secondary relay will be actuated, and during the balance of the release period of the master relay, a control circuit will be completed to the speed adjusting means to cause operation thereof in the proper sense or direction.

Heretofore, in control apparatus of this character, it has been common to connect sensing devices such as, for example, contact brushes to one of the rotatable shafts such as, for example, the slave shaft, and to connect complementary sensing devices, such as a commutator block, to the other shaft with which the speed of the first mentioned shaft is to be compared, in such a manner that the two sensing devices are in engagement with each other whereby relative rotation of the two shafts with respect to each other may be sensed thereby. With such construction, the two sensing devices being in contact with each other, afford a mutual frictional drag on each other, which, of course, varies in accordance with the relative rotation of the two shafts. Thus, for example, it will be seen that with this aforementioned construction, if the master shaft is rotating faster than the slave shaft, the frictional drag therebetween is such that the master shaft tends to carry the slave shaft along with it or, conversely, the slave shaft tends to retard the rotation of the master shaft. On the other hand, it will be seen that if the slave shaft is rotating faster than the master shaft the frictional drag between the two members is such that the slave shaft tends to carry the master shaft along with it, or, conversely the master shaft tends to retard the rotation of the slave shaft. In some instances, such as, for example, when two airplane engines are being compared, one of the engines being the master engine and the other being the slave engine, the frictional drag created between the two sensing devices is not of great importance. However, in other instances, such as, for example, when a constant speed motor, of relatively low power, is used as the master engine to control a more powerful slave unit, such as is often the case in the control of the operation of the engines in modern airplanes, the frictional drag created between the two sensing devices is of importance because of the adverse effect that it may have on the operating characteristics of the relatively light master motor, variations in the speed of rotation of the slave shaft, driven by the powerful airplane engine, which comprises the slave unit in this instance, tending to cause undesirable fluctuations in the operating speed of the master motor.

It is a primary object of my invention to remove such undesirable influence the speed of the slave shaft might have on the speed of the master shaft, or vice versa, in control apparatus of the aforementioned type.

An object ancillary to the foregoing is to enable the sensing devices of such control apparatus to be so constituted and arranged that the rotating portions of the sensing devices driven by the two shafts do not engage each other but are engaged with a common stationary stator.

It is a further object of my invention to enable novel control apparatus embodying sensing devices which are so constituted and arranged that the speed of the slave shaft has no influence on the master shaft, to be constructed in a novel and expeditious manner.

Another object of my invention is to enable novel control apparatus of the aforementioned type to be constructed in such a manner that two rotors may be connected to the respective slave and master shafts and may be disposed in sensing relation to a stator having electrically conductive means afforded therein in a novel and expeditious manner.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
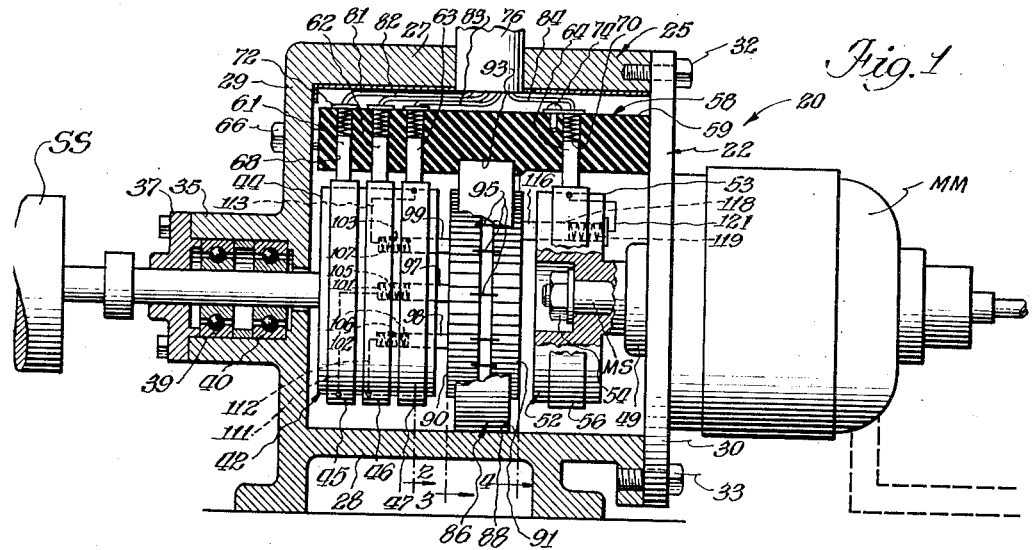
Fig. 1 is a sectional view of control apparatus embodying the principle of my invention.
Figure 2:
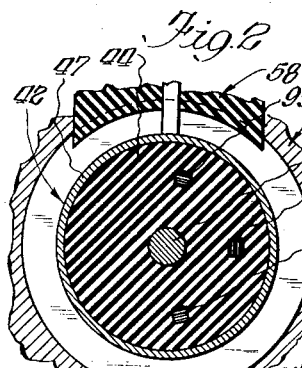
Fig. 2 is a sectional view taken substantially along the line 2—2 in Fig. 1.

In the drawings, control apparatus 20, embodying the principles of my invention, and comprising a switch unit 22 for comparing the relative speed of rotation of a slave shaft SS and a master shaft MS, is shown to illustrate a preferred embodiment of my invention. As shown in the drawings, the master shaft MS is driven by a motor MM. However, it will be seen that if desired another master power unit such as, for example an airplane engine may be used to drive the master shaft MS.

The switch unit 22 comprises a housing 25 including a top wall 27, a bottom wall 28, an end wall 29 and a removable end wall or cover plate 30 mounted in proper relation to the other walls of the housing 25 and removably connected thereto by suitable means such as bolts 32 and 33 extending through the cover plate and screwed into the top wall 27 and the bottom wall 28, respectively.

A boss 35, having a cover plate 37 mounted on its outer end, projects outwardly from the central portion of the end wall 29 and the slave shaft SS, projects inwardly therethrough and is journaled in suitable bearings such as, for example, the roller bearings 39 and 40 mounted therein. A substantially cylindrical-shaped rotor 42 is mounted on the inner end portion of the slave shaft SS within the housing 25 and is secured thereto for rotation therewith. The rotor 42 comprises an insulating block 44 on which three slip rings 45, 46 and 47 are disposed in spaced relation to each other.

The master shaft MS comprises the principal drive shaft of the master motor MM and projects inwardly through the cover plate 30 and is journaled in a suitable bearing 49 afforded on the cover plate. Another rotor 52, comprising an insulating block 53 is mounted on the inner end portion of the master shaft MS and is connected thereto by suitable means such as a nut 54 engaging the shaft MS and the insulating block 53. A slip ring 56 is mounted on the outer peripheral surface of the insulating block 53 and extends therearound.

A brush block 58 comprising an insulating block 59 and four contact brushes 61, 62, 63 and 64 mounted therein, is mounted in the housing 25, above the rotors 42 and 52 and is secured in position therein by suitable means such as bolts 66. The brush block 58 is disposed in the housing 25 in such position that the contact brushes 61, 62, 63 and 64 are disposed in engagement with the slip rings 45, 46, 47 and 56, respectively. The brushes 61—64 are mounted in respective openings 68 formed in the insulating block 59 and are urged downwardly therein into contact with the slip rings 45, 46, 47 and 56, respectively, by springs 70 mounted in the respective openings 68 and retained therein by suitable retaining plates 72 secured in position on the insulating block 59 over the respective openings 68 by suitable means such as screws 74. A connector socket 76, which may be any one of several types which are well known in the art, is mounted in the top wall 27 of the housing 25 and is connected to the brushes 61—64 by any suitable means such as, for example, wires 81, 82, 83 and 84, respectively, connected to the respective retaining plates 72 mounted over the respective opening 68 and engaged with the springs 70 which are engaged with the brushes 61—64, respectively, the socket 76 affording means whereby the brushes 61—64 may be readily connected to outside units such as the control units disclosed in my aforesaid patents.

A stator 86 comprising a substantially cylindrical-shaped insulating block 88 and two groups of commutator bars 90 and 91 disposed in opposite end portions of the insulating block 88, is mounted in the housing 25 with the lower peripheral surface of the insulating block 88 resting on the bottom wall 28, and the upper portion of the insulating block 88 disposed in a notch 93 formed in the central bottom portion of the insulating block 59 of the brush block 58. Thus, it will be seen that the stator 86 is disposed in stationary position in the housing 25 between the two rotors 42 and 52.

Figure 3:
Fig. 3 is a sectional view taken substantially along the line 3—3 in Fig. 1.
Figure 4:
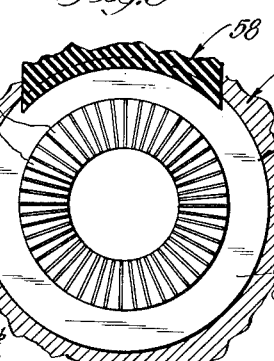
Fig. 4 is a sectional view taken substantially along the line 4—4 in Fig. 1.
Figure 4:
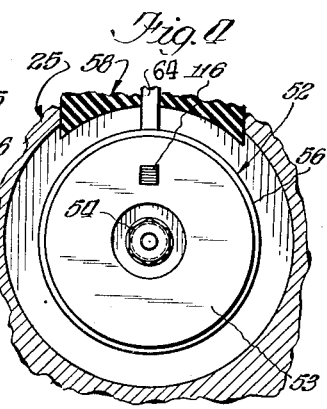

As is best seen in Figs. 1 and 3, the two groups of commutator bars 90 and 91 are disposed in the opposite end portions of the insulating block 88 in such a manner that the end portions of the bars 90 and 91 project outwardly from the respective end faces of the insulating block 88, the commutator bars 90 and 91 in each of the groups being disposed in insulated relation to each other in an annular series around the central portion of the respective end face of the insulating member 88. The commutator bars 90 and 91 are preferably disposed in the insulating block 88 in such a manner that each bar 90 and 91 is disposed in alignment with a corresponding bar 91 or 90 in the other end portion of the insulating block 88. Predetermined ones of the insulating bars 90 and 91 which are spaced a sufficient distance apart to afford the desired timing and other such operational characteristics to my apparatus, such as, for example, every fourth commutator bar 90 and 91, Fig. 1, are electrically connected together by suitable means such as wires 95 mounted in the insulating block 88 to thereby afford electrically conductive paths between the aforementioned predetermined ones of the oppositely disposed commutator bars 90 and 91, for reasons which will be discussed in greater detail presently.

Three contact brushes 97, 98 and 99 are mounted in suitable openings 101, 102 and 103 in the inner end face of the rotor 42 and are urged outwardly therefrom by suitable means such as springs 105, 106 and 107, respectively, into engagement with the commutator bars 90 on the stator 86. The contact brushes 97, 98 and 99 are electrically connected to the slip rings 45, 46 and 47 by suitable means such as wires 111, 112 and 113, respectively, and are so disposed in the end face of the rotor 42 that upon rotation of the rotor 42 the brushes are caused to pass successively over the adjacent end portions of the commutator bars 90 in engagement therewith.

A brush 116 is mounted in a suitable opening 118 formed in the insulating member 53 of the rotor 52 and is urged inwardly by a spring 119 into engagement with the commutator bars 91 in the insulating block 88 of the stator 86. The brush 116 is connected to the slip ring 56 by the spring 119 and a wire 121 having one end connected to the slip ring 56 and the other end connected to the spring 119.

During the operation of control apparatus embodying the switch unit 22 the master shaft MS is rotated in the bearing 49 by a suitable master power unit such as the master motor MM, and the slave shaft SS, rotated by a suitable slave unit such as, for example, the tachometer shaft of an airplane engine, the rotation of the two shafts being in the same direction. Thus, it will be seen that during such an operation of the control apparatus, the brushes 97—99 are caused to pass successively over the commutator bars 90 in engagement therewith, and the contact brush 116 is likewise caused to pass successively over the commutator bars 91. It will be remembered that every fourth contact bar 90 and 91 is electrically connected to the corresponding bars 90 and 91, respectively, by the wires 95 so that if, during rotation of the slave shaft SS and the master shaft MS the brush 116 on the master rotor 52 engages one of the commutator bars 91 which is connected to the corresponding commutator bar 90 at the same time that one of the brushes 97, 98 or 99 is in engagement with the aforesaid corresponding commutator bar 90, an electrical connection is established between the contact brush 116 and the oppositely disposed brush 97, 98 or 99, to thereby electrically connect the wire 84 and one of the wires 81, 82 or 83. For example, it will be seen that if the contact brush 116 is disposed in engagement with a commutator bar 91 at the same time that the contact brush 97 is disposed in engagement with the contact bar 90 electrically connected to the aforementioned contact bar 91, the wire 84 will be connected to the wire 81, this connection being from the wire 84 through the spring 70, the contact brush 64, the slip ring 56, the wire 121, the spring 119, the contact brush 116, the commutator bar 91, the corresponding commutator bar 90, the contact brush 97, the spring 105, the wire 111, the slip ring 45, the contact brush 61, the spring 70 associated with the latter brush, and the retainer plate 72 mounted over the latter spring 70, to the wire 81. The wires 81, 82 and 83 are, of course, in the operation of the control apparatus 20, connected to suitable units in the control apparatus, in the same manner that corresponding wires are connected to such units in the aforesaid Wilson Patents Nos. 2,232,753, 2,443,437 and 2,443,438.

It will be remembered that in order to effect a control operation in control apparatus of the type disclosed in the aforementioned Wilson patents, it is necessary to successively establish electrical circuits between the wires 84 and the wires 81—83 in a predetermined sequence and within a predetermined period of time. I prefer that this sequence be such that an electrical circuit must first be established between the wire 84 and the wire 81 and then established between the wire 84 and the wire 82 or 83, within a predetermined period of time, in order that a control operation will be initiated.

It will be seen that if the slave shaft SS and the master shaft MS are rotating at the same speed in the control apparatus 20, no such successive establishment of a control circuit between the wire 84 and the wires 81—83 will be effected. However, it will be seen that if the slave shaft SS and the master shaft MS are not rotating at the same speed, the shafts will be rotated relative to each other so that the brush 116 will, at certain intervals, be electrically connected to the brush 97 through interconnected commutator bars 90 and 91, and then, after a certain interval of time be electrically connected to either the brush 98 or the brush 99, depending upon whether the relative rotation of the master shaft MS is faster or slower than the shaft SS. Thus it will be seen that the three brushes 97—99, the brush 116, and the selected commutator bars 90 and 91, are so associated that when the speed of the slave shaft SS varies so as to cause relative rotation to exist between that shaft and the master shaft MS, circuits will be established from the wire 84 to the wires 81, 82 and 83 in a sequence which depends upon the sense of such relative rotation and at a frequency depending upon the magnitude of such relative rotation so that the switch unit 22 affords a novel sensing device which may be readily used in control apparatus of the type disclosed in the aforesaid Wilson patents.

Figure 5:
Fig. 5 is a sectional view, somewhat similar to Fig. 3, but showing a modified form of my invention.
Figure 5A:
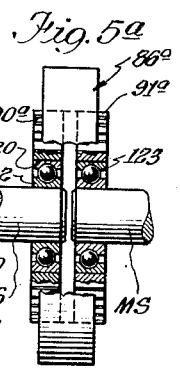
Fig. 5a is an elevational view of the unit shown in Fig. 5, certain parts thereof being broken away to show the internal construction of the unit.

In Figs. 5 and 5a a modified form of my invention is shown, the parts illustrated therein which are identical with parts shown in Figs. 1 to 4, inclusive, being indicated by the same reference numeral, and the parts which are similar to the parts shown in Figs. 1 to 4 being indicated by the same reference numerals with the suffix "a" added thereto. Thus it will be seen that in Figs. 5 and 5a a commutator 86a is shown which comprises an insulating block 88a having a plurality of commutator bars 90a and 91a mounted thereon in the same manner that the bars 90 and 91 are mounted on the commutator 86 shown in Figs. 1 to 4, inclusive, as previously discussed. The principal difference between the commutator 86a and the commutator 86 is that an opening 120 is afforded in the central portion of the insulating block 88a and extends longitudinally therethrough and the two shafts SS and MS are journaled in bearings 122 and 123 mounted in the opening 120. Thus it will be seen that a compact control unit may be afforded wherein the master shaft MS and the slave shaft SS are journaled in the commutator 86a to thereby afford relatively rigid support for the two shafts.

Figure 6:
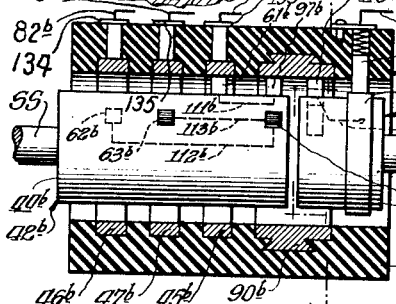
Fig. 6 is a longitudinal sectional view, somewhat similar to Fig. 1, but showing another modified form of my invention.
Figure 6A:
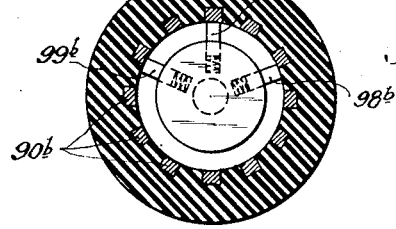
Fig. 6a is a sectional view taken substantially along the line 6a—6a in Fig. 6.

In Figs. 6 and 6a of the drawings, another modified form of my invention is shown, and those parts shown therein which are identical to parts shown in Figs. 1 to 4, inclusive, are indicated by the same reference numerals, and those parts shown therein which are similar to parts shown in Figs. 1 to 4, inclusive, are shown by the same reference numerals with the suffix "b" added thereto.

Thus, it will be seen that in Figs. 6 and 6a a commutator 86b is shown which comprises a hollow, substantially cylindrical-shaped insulating block 88b, having a plurality of commutator bars 90b mounted in the inner peripheral surface thereof, the commutator bars being disposed in spaced relation to each other in an annular series around the inner peripheral surface of the insulating block 88b at one end portion thereof.

Three slip rings 45b, 46b and 47b are mounted in spaced relation to each other in the opposite end portion of the inner peripheral surface of the insulating block 88b from that in which the commutator bars 90b are disposed.

A rotor 52b is mounted on an end portion of a master shaft MS and is disposed in the first mentioned end portion of the insulating block 88b, and comprises an insulating block 53b having a slip ring 56b mounted on the outer peripheral surface thereof and extending therearound. A contact brush 64b, connected to a wire 84b is mounted in the insulating block 88b and is engaged with the slip ring 56b. The slip ring 56b is connected by a wire 121b to a contact brush 116b mounted in the insulating block 53b and projecting radially outwardly therefrom into engagement with the outer end portion of the commutator bars 90b.

In the other end portion of the insulating block 88b a rotor 42b including an insulating block 44b is mounted on the inner end portion of a slave shaft SS. Three contact brushes 97b, 98b and 99b are yieldingly mounted in the inner end portion of the cylindrical-shaped insulating block 44b, and project outwardly therefrom into engagement with the inner end portion of the commutator bars 90b. The contact brushes 97b—99b are electrically connected by wires 111b, 112b and 113b to contact brushes 61b, 62b and 63b, respectively, which are mounted in the outer end portion of the insulating block 44b and project radially outwardly therefrom into engagement with the slip rings 45b, 46b and 47b, respectively. The slip rings 45b—47b are connected by suitable contact members 133, 134 and 135 to wires 81b, 82b and 83b, respectively.

Thus, it will be seen that when the brush 116b is in engagement with one of the commutator bars 90b with which one of the other brushes 97b, 98b or 99b is engaged, an electrical circuit may be established between the wire 84b and the wire 81b, 82b or 83b, in a manner similar to that previously discussed with respect to the control apparatus shown in Figs. 1 to 4, inclusive. For example, it will be seen that when the contact brush 116b and the contact brush 97b are simultaneously in engagement with the same commutator bar 90b, the wire 84b is electrically connected to the wire 81b, the circuit in this instance being from the wire 84b through the brush 64b, the slip ring 56b, the wire 121b, the brush 116b, the aforementioned commutator bar 90b, the brush 97b, the wire 111b, the contact brush 61b, the slip ring 45b, and the contact member 133 to the wire 81b.

From the foregoing it will be seen that I have afforded a novel control apparatus wherein the parts are constituted and arranged in such a manner that the relative speed of the slave shaft has no influence on the speed of the master shaft.

Furthermore, it will be seen that I have afforded a novel control apparatus whereby a single, stationary stator may be associated with two rotors in a novel and expeditious manner to afford a novel sensing device therefor.

In addition, it will be seen that I have afforded a novel control apparatus which is practical and efficient in operation and which may be economically produced commercially.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a switch of the type adapted to be used in control apparatus for comparing the relative speed of two rotating shafts, a stationary commutator block comprising electrical insulating material, two rotors rotatably mounted at opposite sides of said block, said rotors being rotatable relative to said block and relative to each other, a plurality of contact brushes carried by said rotors in engagement with said block, and means, including a plurality of commutator bars mounted in said block in insulated, spaced relation therearound, for selectively electrically connecting brushes on said rotors to thereby sense the position of said rotors relative to said block and each other.

2. A switch of the type adapted to be used in control apparatus for comparing the relative speed of two rotating shafts, a supporting member, a commutator block comprising electrical insulating material and mounted on said supporting member in stationary relation thereto, two rotors rotatably mounted on said supporting member on opposite sides of said block, said rotors being rotatable relative to said block, a plurality of contact brushes carried by said rotors in engagement with said block, and conductor means on said block affording electrically conductive paths between predetermined spaced areas on opposite sides of said block between said rotors for selectively interconnecting a brush on one of said rotors with a brush on the other of said rotors when said last mentioned brushes on said two rotors are disposed in contact with electrically connected respective ones of said areas on opposite sides of said block.

3. A switch of the type adapted to be used in control apparatus for sensing the relative rotation of two rotating members, a supporting member, a stator mounted on said supporting member in stationary relation thereto, two rotors rotatably mounted on said supporting member, said rotors being rotatable relative to said stator, electrically conductive means mounted on each of said rotors and rotatable therewith in engagement with said stator, said conductive means on one of said rotors being in engagement with one area on said stator during rotation with said one rotor, said conductive means on the other of said rotors being in engagement with another area on said stator during rotation with said other rotor, and means affording electrical connections between predetermined portions of said two areas at spaced intervals thereon for selectively interconnecting one of said conductive means on one of said two rotors with conductive means on the other of said rotors, when said last mentioned means on said two rotors are simultaneously disposed in contact with electrically interconnected portions on said two areas.

4. In control apparatus of the type adapted to control the relative speed of two rotating shafts, a stationarily disposed commutator block having a plurality of commutator bars, said commutator bars being disposed in two groups with said groups disposed on opposite sides of said commutator block, each of said groups comprising a plurality of commutator bars insulated from each other and disposed in an annular series, means electrically connecting predetermined ones of said commutator bars in one of said groups to predetermined ones of said commutator bars in the other of said groups, two rotors rotatably mounted relative to said commutator, and sensing means connected to said rotors for determining the relative position of said rotors to said groups of commutator bars, said sensing means including brush means mounted in said rotors and bearing against said commutator bars, said brush means in one of said rotors bearing against said commutator bars in said one group, and said brush means in the other of said rotors bearing against said commutator bars in said other group.

5. In control apparatus for controlling the relative speed of rotation of two rotatable members, a housing, a commutator mounted in said housing in stationary relation thereto, said commutator having two parallel groups of commutator bars, each of said groups comprising a plurality of commutator bars insulated from each other and disposed in an annular series, two rotors rotatably mounted in said housing on opposite sides of said commutator, individual brush means mounted in said rotors and bearing against said commutator bars, said brush means in one of said rotors bearing against said commutator bars in one of said groups, and said brush means in the other of said rotors bearing against said commutator bars in the other of said groups, and means affording individual electrical connections to said brush means from outside of said housing.

6. A switch comprising a housing, a stator mounted in said housing in stationary relation thereto and having two oppositely disposed faces, a plurality of commutator bars mounted in said stator in two groups, each of said groups comprising a plurality of commutator bars insulated from each other and disposed in an annular series in a corresponding one of the faces of said stator, two rotors rotatably mounted in said housing on opposite sides of said stator, each of said rotors being disposed adjacent to a corresponding one of said groups of commutator bars in axial alignment therewith, and means for sensing the rotation of said rotors relative to said commutator, said means including a plurality of contact brushes mounted in said rotors, each of said contact brushes bearing against the commutator bars in said group corresponding to the said rotor in which said contact brush is mounted.

7. A switch comprising a housing, a commutator block mounted in said housing in stationary relation thereto and having two oppositely disposed faces, a plurality of commutator bars mounted in said block in two groups, each of said groups comprising a plurality of bars insulated from each other and disposed in an annular series in a corresponding one of the faces of said block, two rotors rotatably mounted in said housing on opposite sides of said block, each of said rotors being disposed adjacent to a corresponding one of said groups of bars in axial alignment therewith, individual contact brushes mounted in said rotors and bearing against commutator bars in the said group corresponding to the said rotor in which said contact brushes are mounted, and means including slip rings mounted on said rotors for affording electrical connections to said individual brushes from outside of said housing.

8. In a switch, a commutator plate having an elongated opening extending transversely therethrough, a plurality of commutator bars mounted in said plate in two groups, each of said groups comprising a plurality of commutator bars insulated from each other and arranged in an annular series around said opening, said groups of commutator bars being disposed on opposite sides of said plate from each other, two shafts journaled in opposite end portions of said opening for rotation therein, two rotors, each of said rotors being mounted on a corresponding one of said shafts for rotation therewith, and means for sensing the relative rotations of said rotors, said means including contact brushes mounted in individual ones of said rotors and movable therewith in engagement with the said commutator bars in a corresponding one of said groups.

9. A switch comprising an elongated housing, a commutator block of insulating material mounted in said housing in stationary relation thereto, two shafts extending into said housing from opposite ends thereof and journaled therein in spaced relation to each other, two rotors, each of said rotors being mounted on a corresponding one of said shafts for rotation therewith, said rotors being disposed on opposite sides of said commutator block from each other, commutator bars mounted in said commutator block in two groups, each of said groups comprising a plurality of commutator bars insulated from each other and disposed on said commutator block in an annular series, each of said groups of commutator bars being mounted in said commutator block on the side thereof adjacent a corresponding one of said rotors in axial alignment with said shaft on which said corresponding rotor is mounted, contact brushes mounted in individual ones of said rotors and bearing against commutator bars in said corresponding one of said groups, and means including slip rings mounted on said rotors and connected to corresponding ones of said brushes for affording electrical connections from outside of said housing to individual ones of said brushes.

10. In a switch of the type adapted to be used in control apparatus for sensing the relative rotation of two rotatable members, a commutator block of insulating material, a plurality of elongated commutator bars mounted in an annular series in said block and insulated from each other, two rotors rotatably mounted relative to said commutator block, and a plurality of contact brushes in said rotors with a plurality of said contact brushes mounted in one of said rotors and bearing against one end portion of said commutator bars, and one of said first mentioned contact brushes being mounted in the other of said rotors and bearing against the other end portion of said commutator bars.

11. In a switch of the type adapted to be used in control apparatus for comparing the relative rotation of two rotatable members, a commutator block comprising electrical insulating material, a plurality of elongated commutator bars mounted in an annular series in said block in insulated and spaced relation to each other, two rotors rotatably mounted in said block, and a plurality of contact brushes a plurality of said contact brushes projecting outwardly from the periphery of one of said rotors and a single contact brush projecting outwardly from the other of said rotors for sensing the relative rotation of said rotors, said contact brushes in said one rotor and said contact brush in the other of said rotors being disposed in the respective one of said rotors for engagement with a respective end portion of said contact bars during rotation of said respective rotor relative to said commutator block.

12. In a switch of the type adapted to be used in control apparatus for controlling the relative rotation of two rotatable members, a tubular commutator block comprising electrical insulating material, a plurality of elongated commutator bars embedded in the inner peripheral surface of said block in a manner to afford exposed inwardly facing surfaces of said bars, said bars being disposed in said block in an annular series around said inner periphery of said block with each of said bars insulated from, and spaced a predetermined distance from, the adjacent ones of said bars, two rotors rotatably mounted in said block, a plurality of contact brushes mounted in one of said rotors within said block, said brushes being spaced from each other around the periphery of said one rotor and projecting outwardly from said one rotor into engagement with said inner peripheral surface of said block in a position whereby upon rotation of said one rotor in said block each of said brushes is moved successively into engagement with said exposed surface of each of said commutator bars, and one contact brush mounted in the other of said rotors within said block, said one brush projecting outwardly from said other rotor into engagement with said inner peripheral surface of said block in a position whereby upon rotation of said other rotor said one brush is moved necessarily into engagement with said exposed surface of each of said commutator bars.

13. A switch of the type adapted to be used in control apparatus for sensing the relative rotation of two rotating members, a housing having two oppositely disposed end walls, a commutator block of insulating material mounted in said housing between said walls in stationary relation to said housing, a plurality of electrically conductive means mounted on said commutator block in spaced relation to each other in an annular series therearound, each of said conductive means having two opposite end portions embedded in said commutator block, two rotors disposed in spaced relation to each other, each of said rotors being journaled in a respective one of said walls, and a plurality of electrical contact means on said rotors with the contact means on one of said rotors bearing against one of said end portions of said conductive means, and the contact means on the other of said rotors bearing against the other of said end portions of said conductive means.

ROSSER L. WILSON.

References Cited in the file of this patent

UNITED STATES PATENTS

| Number | Name | Date |
|---|---|---|
| 988,792 | Lertourne | Apr. 4, 1911 |
| 1,831,735 | Blum | Nov. 10, 1931 |